United States Patent [19]
Gelbart

[11] Patent Number: 4,577,932
[45] Date of Patent: Mar. 25, 1986

[54] MULTI-SPOT MODULATOR USING A LASER DIODE

[75] Inventor: Daniel Gelbart, Burnaby, Canada

[73] Assignee: Creo Electronics Corporation, Burnaby, Canada

[21] Appl. No.: 608,222

[22] Filed: May 8, 1984

[51] Int. Cl.$^4$ .......................... G02F 1/11; H04N 5/74
[52] U.S. Cl. ..................................... 350/358; 358/235
[58] Field of Search ........................ 350/358; 358/235

[56] References Cited

U.S. PATENT DOCUMENTS

| | | | |
|---|---|---|---|
| 3,737,573 | 6/1973 | Kessler | 358/235 |
| 4,162,121 | 7/1979 | Starkweather et al. | 350/358 |
| 4,240,715 | 12/1980 | McNancy | 350/358 |
| 4,280,755 | 7/1981 | McNancy | 350/358 |
| 4,390,875 | 6/1983 | McNancy | 350/358 |
| 4,421,387 | 12/1983 | Sprague | 350/358 |

Primary Examiner—Bruce Y. Arnold

[57] ABSTRACT

A multi-spot light modulator using a laser diode is disclosed in which a single light pulse from the laser diode generates a multi-spot image of a data pattern, each spot corresponding to an active bit of the data pattern. The ability of a pulsed laser diode to generate a narrow light pulse is used to image an acoustic wave corresponding to the data pattern without the normal degradation in resolution caused by the motion of the acoustic wave.

3 Claims, 2 Drawing Figures

MULTI-SPOT MODULATOR USING A LASER DIODE

BACKGROUND OF THE INVENTION

Multi-spot modulators are used for high speed recording of data on a light sensitive material in laser printers, plotters and optical data storage devices. A multi-spot modulator is faster than single spot modulators since it records a plurality of bits simultaneously. This invention relates to the use of an acousto-optic modulator as a multi-spot modulator. The prior art generates multiple spots with acousto-optic modulators by using multiple frequencies simultaneously (such as the multi-spot modulators sold by the Isomet Corporation, U.S.A.), by using multiple transducers simultaneously or by imaging a multi-spot acoustic pattern using the Scophony effect to avoid the image degradation caused by the motion of the acoustic wave. It is the object of this invention to make a multi-spot modulator in order to generate a permanent optical record of a data pattern using a laser diode. The current invention uses a single frequency amplitude modulation (AM) to modulate the acousto-optic modulator and uses a short light pulse from a laser diode to avoid the effects of the acoustic wave motion. The low duty cycle and high peak power of the laser diode in this invention also allows the incorporation of frequency doubling using a crystal with non-linear optical properties.

BRIEF DESCRIPTION OF THE DRAWINGS

Further details of the invention will become apparent by considering the preferred embodiment in conjunction with the following drawings, in which.

DETAILED DESCRIPTION

Figure 1:
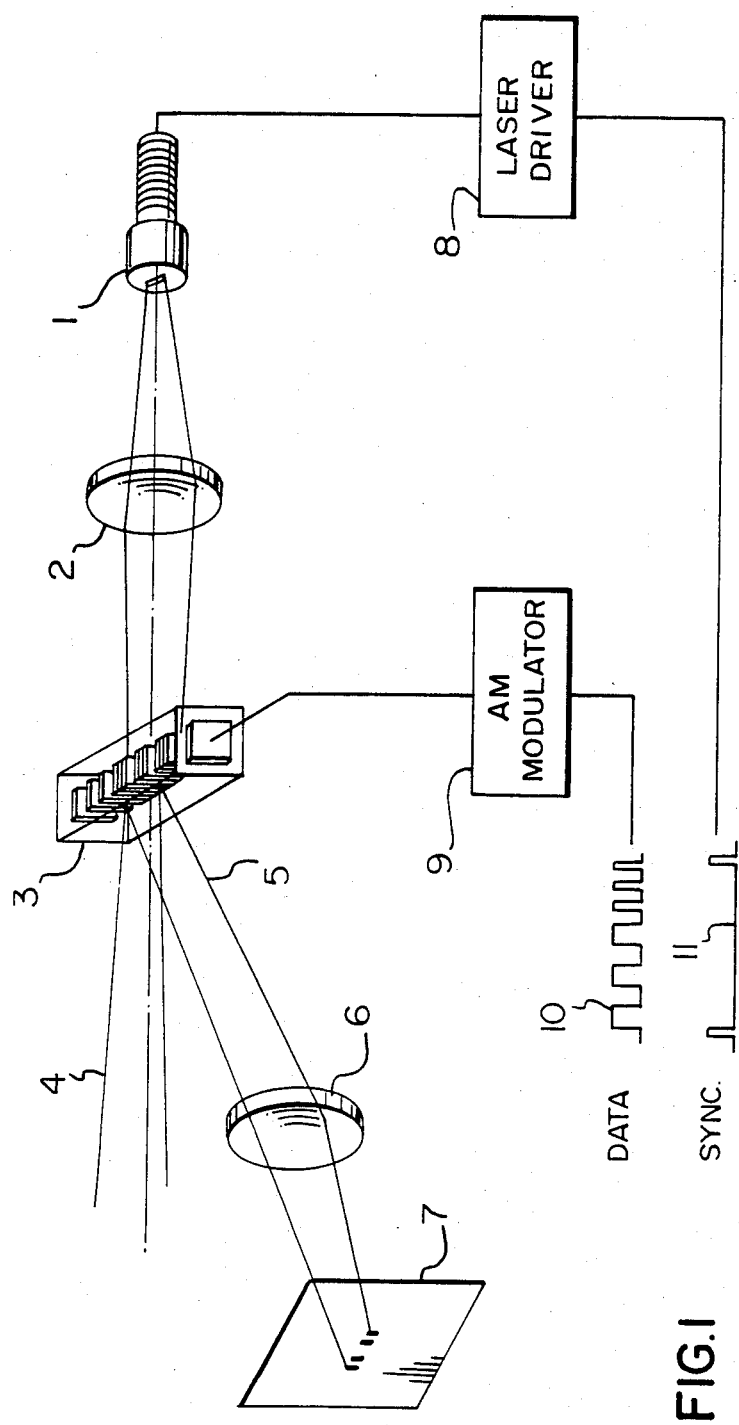
FIG. 1 represents an embodiment of the invention and FIG. 2 represents an embodiment of the invention when used with a frequency doubling crystal.

Referring now to FIG. 1, the preferred embodiment consists of a laser diode 1, a focussing lens 2 placed to project the magnified image of the laser diode emitting apperture onto an acousto-optic modulator 3. The undiffracted beam 4 from the acousto-optic modulator is not used while the diffracted beam 5 is focussed by a second lens 6 to form an image of the acoustic field inside the modulator 3 onto a light sensitive material 7. The distances between the components are such that the image of laser diode 1 is formed inside modulator 3 and the image of the acoustic wave inside modulator 3 is formed on the light sensitive material 7. The focal length and size of the first lens 2 is chosen to capture the radiated light from the laser diode and illuminate the desired portion of the acousto-optic modulator 3. The focal length of the second lens is chosen to reduce the image of the acoustic wave by the desired amount. In the preferred embodiment diode 1 will be a pulsed laser diode of about 10 W peak power, such as available from RCA or Sanders Associateds (USA). Lens 2 will magnify the 20×200 $\mu$m exit aperture of this laser diode by about a factor of 10, the forming an image of about 200×2000 $\mu$m in the acousto-optic modulator. The modulator is of standard construction, such as available from Isomet (USA) or Crystal Technology (USA) operating at 200 MHz. The laser diode driver and modulator driver are items well known to those versed in the art.

The laser diode 1 is of the pulsed type. The laser-diode driver 8 generates a narrow current pulse of about 1 nS duration. The AM modulator 9 converts the input data 10 to an amplitude modulated carrier at the operating frequency of the acousto-optic cell, in this case 200 MHz. The data rate is selected such that a single bit is longer than the exposure pulse from the laser diode. In this embodiment one data bit is about 10 nS. Since the acoustic wave travels in the acousto-optics modulator at a velocity of about 3.63 mm/$\mu$S' (for Lead Molibdate), it will cover the 2 mm aperture in about 550 nS. Assuming 10 nS per bit this will allow 55 bits to be inside the acousto-optic modulator aperture at any time, thus the sync pulse 11 should be supplied every 55 bits of data.

In operation the desired data pattern 10 is fed to the acousto-optic modulator 3 via the AM modulator 9. The bit pattern modulates a carrier which generates an acoustic wave inside 3 by using a piezo-electric transducer bonded to the acousto-optic material. When all the data bits were converted to acoustic energy the sync pulse 11 generates a narrow light pulse out of laser diode 1. This light pulse images the acoustic field onto light sensitive material 7 and forms a permanent record of the data pattern 10. By moving material 7 a new bit pattern can be recorded with a new light pulse. Since the light pulse is much shorter than a single data bit the image on material 7 is not degraded by the fact that the acoustic wave is moving while being imaged.

The image of the acoustic wave is formed by the well known mechanism of diffracting the light. The travelling acoustic wave acts as a diffraction grating causing light to be diffracted each time it encounters a packet of acoustic energy being generated by the input data. The operation of the acousto-optic modulator is similar to its well known application as a laser light modulator. As in all applications of this modulator it should be oriented in a way that the light will enter it at the Bragg angle to maximize the diffraction efficiency and therefore the output light.

Figure 2:
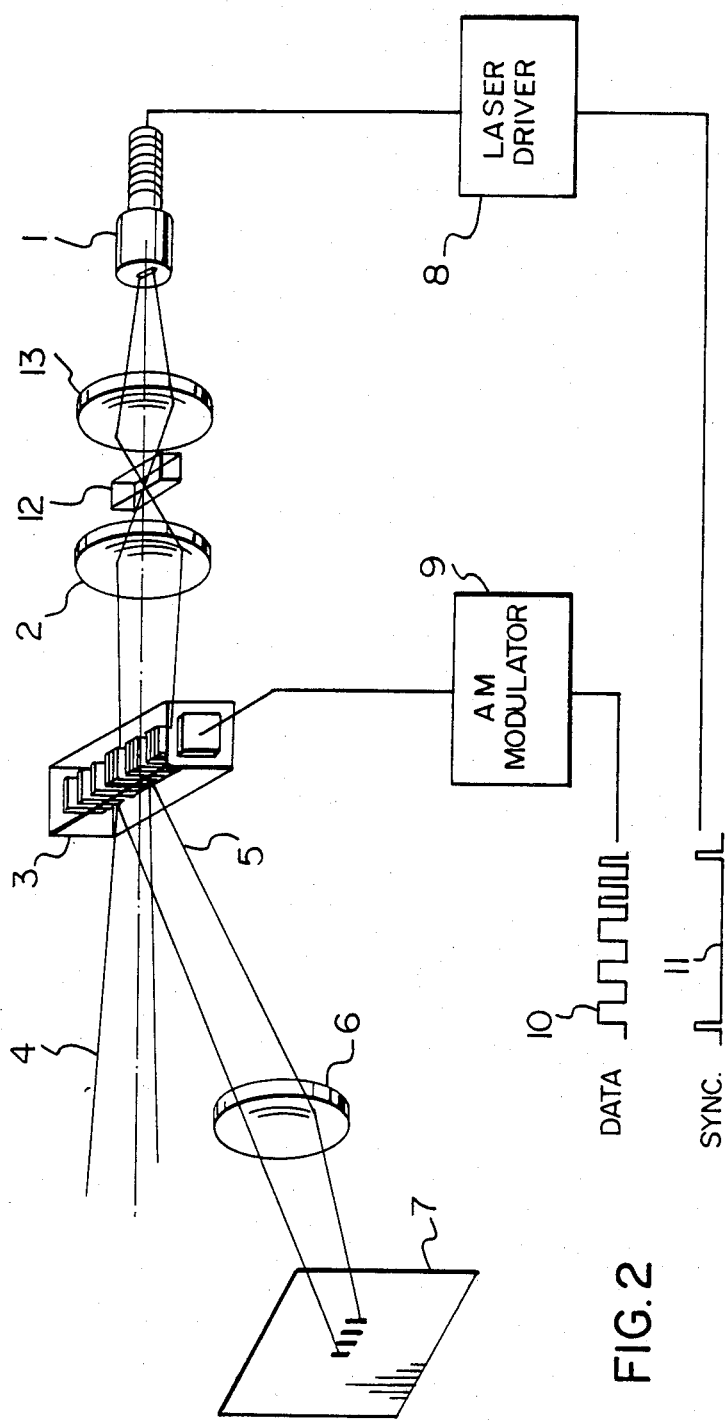

A variation on the preferred embodiment is shown in FIG. 2. In this embodiment the wavelength of the laser diode is halved by using a non-linear optical crystal 12. These crystals are available from Cleveland Crystals (USA) and are made of non-linear optical materials such as $LiIO_3$. The light is focussed through the crystal 12 by a lens 13 in order to increase the power density. The angle of the crystal is adjusted to maximize the second harmonic generation. The output light, at the second harmonic, is focussed into the acousto-optic modulator. The Bragg angle is, of course, re-adjusted for the new wavelength. Using the second harmonic has the advantage of higher resolution and, since currently available laser diodes operate in the infrared, makes the operation visible.

Since the efficiency of frequency doubling increases with the square of the power density using a pulsed laser diode with a low duty cycle and high peak power is desireable.

What is claimed is:

1. A multi-spot light modulator comprising:
a laser operating in the pulsed mode; an acousto-optic modulator and means for converting a data pattern into a corresponding acoustic wave inside said modulator, said modulator for diffracting a beam from said laser; a lens for focussing a light pulse from said laser onto said acoustic wave;

a light sensitive material for generating a permanent record;

a second lens located in said diffracted output beam of said modulator for forming an image of said acoustic wave onto said light sensitive material; and means for synchronizing said light pulse with said data pattern in order to generate a permanent record of said data pattern on said light sensitive material.

2. A multi-spot light modulator as described in claim 1 further comprising a crystal of non-linear optical material positioned in the path of the laser pulse in order to double the frequency of the laser light; and, a focussing lens for concentrating light output of said laser into said non linear material in order to increase the efficiency of the frequency doubling.

3. A multi-spot modulator as described in claims 1 or 2 wherein said laser is a laser diode.

* * * * *